United States Patent
Pham Van et al.

(10) Patent No.: US 11,178,427 B2
(45) Date of Patent: Nov. 16, 2021

(54) DYNAMIC SUB-PARTITION INTRA PREDICTION FOR VIDEO CODING

(71) Applicant: QUALCOMM Incorporated, San Diego, CA (US)

(72) Inventors: Luong Pham Van, San Diego, CA (US); Adarsh Krishnan Ramasubramonian, Irvine, CA (US); Geert Van der Auwera, Del Mar, CA (US); Marta Karczewicz, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 16/783,748

(22) Filed: Feb. 6, 2020

(65) Prior Publication Data

US 2020/0260115 A1  Aug. 13, 2020

Related U.S. Application Data

(60) Provisional application No. 62/803,209, filed on Feb. 8, 2019.

(51) Int. Cl.
*H04N 19/593* (2014.01)
*H04N 19/147* (2014.01)
*H04N 19/176* (2014.01)

(52) U.S. Cl.
CPC ......... *H04N 19/593* (2014.11); *H04N 19/147* (2014.11); *H04N 19/176* (2014.11)

(58) Field of Classification Search
CPC ..................... H04N 19/593; H04N 19/119
See application file for complete search history.

(56) References Cited

U.S. PATENT DOCUMENTS

| | | | | |
|---|---|---|---|---|
| 2014/0376643 | A1* | 12/2014 | Hendrry | H04N 19/91 375/240.26 |
| 2015/0208090 | A1* | 7/2015 | Sakakibara | H04N 19/11 375/240.12 |
| 2015/0281728 | A1* | 10/2015 | Karczewicz | H04N 19/27 375/240.16 |
| 2019/0104303 | A1* | 4/2019 | Xiu | H04N 19/182 |
| 2019/0149836 | A1* | 5/2019 | Moon | H04N 19/513 375/240.16 |
| 2019/0281305 | A1* | 9/2019 | Choi | H04N 19/132 |

(Continued)

OTHER PUBLICATIONS

Bross B., et al., "Versatile Video Coding (Draft 4)", Joint Video Experts Team (JVET) of ITU-T SG 16 WP 3 and ISO/IEC JTC 1/SC 29/WG 11, 13th Meeting: Marrakech, MA, Jan. 9-18, 2019, JVET-M1001-v1, 241 Pages.

(Continued)

*Primary Examiner* — Jerry T Jean Baptiste
(74) *Attorney, Agent, or Firm* — Shumaker & Sieffert, P.A.

(57) ABSTRACT

An example device for coding (encoding or decoding) video data includes a memory configured to store video data; and one or more processors implemented in circuitry and configured to: partition a coding unit (CU) of video data into sub-blocks, the sub-blocks being arranged into a number of rows and a number of columns, the number of rows being greater than 1 and the number of columns being greater than 1; form intra-prediction blocks for each of the sub-blocks; and code the CU using the intra-prediction blocks.

30 Claims, 10 Drawing Sheets

(56) References Cited

U.S. PATENT DOCUMENTS

2020/0014919 A1\* 1/2020 Zhao .................... H04N 19/105
2020/0260114 A1\* 8/2020 Zhao ...................... H04N 19/11

OTHER PUBLICATIONS

Chen J., et al., "Algorithm Description of Joint Exploration Test Model 1," 1, JVET Meeting; Oct. 19, 2015-Oct. 21, 2015; Geneva;(The Joint Video Exploration Team of ISO/IEC JTC1/SC29/WG11 and ITU-T SG.16 ); URL: http://phenix.int-evry.fr/jvet/,, No. JVET-A1001 Feb. 24, 2016 (Feb. 24, 2016), XP030150000, 27 pages.

Ergen S., "ZigBee/IEEE 802.15.4 Summary", Sep. 10, 2004, 37 Pages.

Hernández S-D., et al., "CE3: Line-based intra coding mode (Tests 2.1.1 and 2.1.2)", 12th JVET Meeting, Oct. 3, 2018-Oct. 12, 2018, Macao, CN, (The Joint Video Exploration Team of ISO/IEC JTC1/SC29/WG11 and ITU-T-SG.16), No. JVET-L0076-V2, Fraunhofer HHI, pp. 1-10.

IEEE Std 802.11ad-2012: "Part 11: Wireless LAN Medium Access Control (MAC) and Physical Layer (PHY) Specifications—Amendment 3: Enhancements for Very High Throughput in the 60 GHz Band", LAN/MAN Standards Committee of the IEEE Computer Society, Dec. 28, 2012, 628 Pages.

ITU-T H.223, Series H: Audiovisual and Multimedia Systems, Infrastructure of Audiovisual Services—Transmission Multiplexing and Synchronization, Multiplexing Protocol for Low Bit Rate Multimedia Communication, The International Telecommunication Union, Jul. 2001, 74 Pages.

ITU-T H.265, "Series H: Audiovisual and Multimedia Systems, Infrastructure of audiovisual services—Coding of moving video, High efficiency video coding," The International Telecommunication Union. Dec. 2016, 664 Pages.

\* cited by examiner

DYNAMIC SUB-PARTITION INTRA PREDICTION FOR VIDEO CODING

This application claims the benefit of U.S. Provisional Application No. 62/803,209, filed Feb. 8, 2019, the entire contents of which are hereby incorporated by reference.

TECHNICAL FIELD

This disclosure relates to video coding, including video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques related to sub-partitioning or sub-block intra prediction of a block of video data. These techniques may improve coding of intra-predicted blocks that are sub-block partitioned. Although these techniques are generally described with respect to Versatile Video Coding (VVC), these techniques may be applied to coding techniques for any image, e.g., of video or still images.

In one example, a method of coding video data includes partitioning a coding unit (CU) of video data into sub-blocks, the sub-blocks being arranged into a number of rows and a number of columns, the number of rows being greater than 1 and the number of columns being greater than 1; forming intra-prediction blocks for each of the sub-blocks; and coding the CU using the intra-prediction blocks.

In another example, a device for coding video data includes a memory configured to store video data; and one or more processors implemented in circuitry and configured to: partition a coding unit (CU) of video data into sub-blocks, the sub-blocks being arranged into a number of rows and a number of columns, the number of rows being greater than 1 and the number of columns being greater than 1; form intra-prediction blocks for each of the sub-blocks; and code the CU using the intra-prediction blocks.

In another example, a device for coding video data includes means for partitioning a coding unit (CU) of video data into sub-blocks, the sub-blocks being arranged into a number of rows and a number of columns, the number of rows being greater than 1 and the number of columns being greater than 1; means for forming intra-prediction blocks for each of the sub-blocks; and means for coding the CU using the intra-prediction blocks.

In another example, a computer-readable storage medium has stored thereon instructions that, when executed, cause a processor to: partition a coding unit (CU) of video data into sub-blocks, the sub-blocks being arranged into a number of rows and a number of columns, the number of rows being greater than 1 and the number of columns being greater than 1; form intra-prediction blocks for each of the sub-blocks; and code the CU using the intra-prediction blocks.

The details of one or more examples are set forth in the accompanying drawings and the description below. Other features, objects, and advantages will be apparent from the description, drawings, and claims.

DETAILED DESCRIPTION

Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions.

High-Efficiency Video Coding (HEVC), was finalized by the Joint Collaboration Team on Video Coding (JCT-VC) of ITU-T Video Coding Experts Group (VCEG) and ISO/IEC Motion Picture Experts Group (MPEG) in April 2013.

The Joint Video Experts Team (WET), a collaborative team formed by MPEG and ITU-T Study Group 16's VCEG is recently working on a new video coding standard to be known as Versatile Video Coding (VVC). The primary objective of VVC is to provide a significant improvement in compression performance over the existing HEVC standard, aiding in deployment of higher-quality video services and emerging applications such as 360° omnidirectional immersive multimedia and high-dynamic-range (HDR) video. A working draft of VVC, henceforth referred to as VVC WD4 in this document, is available at phenix.it-sudparis.eu/jvet/doc_end user/documents/13 Marrakech/wg11/WET-M1001-v1.zip.

Figure 1:
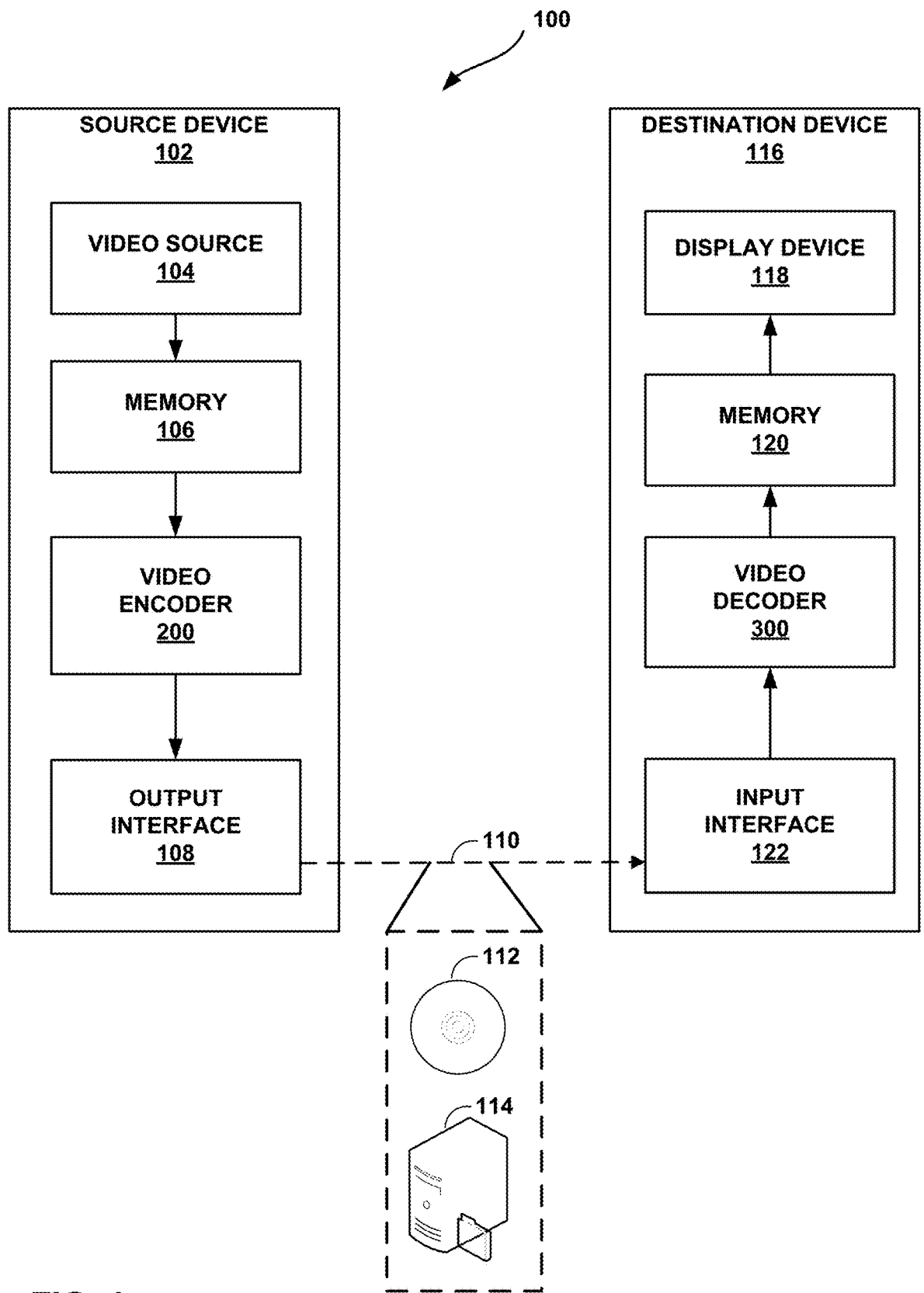
FIG. 1 is a block diagram illustrating an example video encoding and decoding system that may perform the techniques of this disclosure.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, uncoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may comprise any of a wide range of devices, including desktop computers, notebook (i.e., laptop) computers, tablet computers, set-top boxes, telephone handsets such smartphones, televisions, cameras, display devices, digital media players, video gaming consoles, video streaming device, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for sub-block intra-prediction. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than including an integrated display device.

System 100 as shown in FIG. 1 is merely one example. In general, any digital video encoding and/or decoding device may perform techniques for sub-block intra-prediction. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, devices 102, 116 may operate in a substantially symmetrical manner such that each of devices 102, 116 include video encoding and decoding components. Hence, system 100 may support one-way or two-way video transmission between video devices 102, 116, e.g., for video streaming, video playback, video broadcasting, or video telephony.

In general, video source 104 represents a source of video data (i.e., raw, uncoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some example, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may modulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 116. Similarly, destination device 116 may access encoded data from storage device 116 via input interface 122. Storage device 116 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video generated by source device 102. Destination device 116 may access stored video data from file server 114 via streaming or download. File server 114 may be any type of server device capable of storing encoded video data and transmitting that encoded video data to the destination device 116. File server 114 may represent a web server (e.g., for a website), a File Transfer Protocol (FTP) server, a content delivery network device, or a network attached storage (NAS) device. Destination device 116 may access encoded video data from file server 114 through any standard data connection, including an Internet connection. This may include a wireless channel (e.g., a Wi-Fi connection), a wired connection (e.g., DSL, cable modem, etc.), or a combination of both that is suitable for accessing encoded video data stored on file server 114. File server 114 and input interface 122 may be configured to operate according to a streaming transmission protocol, a download transmission protocol, or a combination thereof.

Output interface 108 and input interface 122 may represent wireless transmitters/receiver, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a cathode ray tube (CRT), a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream. If applicable, MUX-DEMUX units may conform to the ITU H.223 multiplexer protocol, or other protocols such as the user datagram protocol (UDP).

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as the Joint Exploration Test Model (JEM) or ITU-T H.266, also referred to as Versatile Video Coding (VVC). The techniques of this disclosure, however, are not limited to any particular coding standard.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to JEM or VVC. According to JEM or VVC, a video coder (such as video encoder 200) partitions a picture into a plurality of coding tree units (CTUs). Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree (QT) partition, a binary tree (BT) partition, and one or more types of triple tree (TT) partitions. A triple tree partition is a partition where a block is split into three sub-blocks. In some examples, a triple tree partition divides a block into three sub-blocks without dividing the original block through the center. The partitioning types in MTT (e.g., QT, BT, and TT), may be symmetrical or asymmetrical.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning per HEVC, QTBT partitioning, MTT partitioning, or other partitioning structures. For purposes of explanation, the description of the techniques of this disclosure is presented with respect to QTBT partitioning. However, it should be understood that the techniques of this disclosure may also be applied to video coders configured to use quadtree partitioning, or other types of partitioning as well.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may comprise N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of JEM and VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of JEM and VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the coefficients, providing further compression. By performing the quantization process, video encoder 200 may reduce the bit depth associated with some or all of the coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

This disclosure may generally refer to "signaling" certain information, such as syntax elements. The term "signaling" may generally refer to the communication of values syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

Figure 2A:
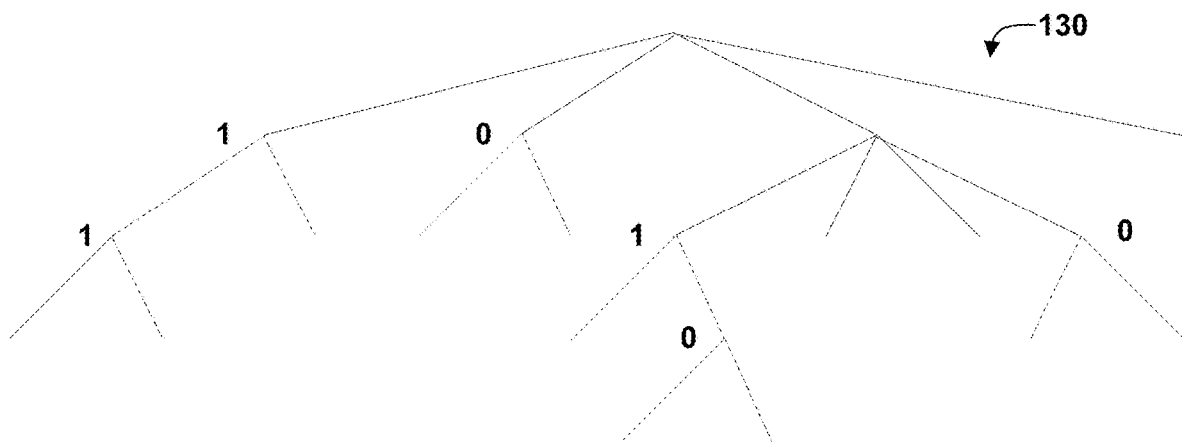
FIGS. 2A and 2B are conceptual diagrams illustrating an example quadtree binary tree (QTBT) structure, and a corresponding coding tree unit (CTU).
Figure 2B:
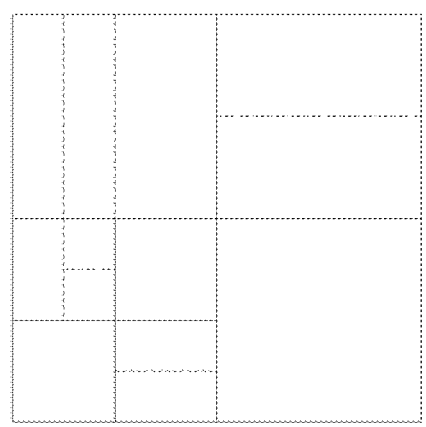

FIGS. 2A and 2B are conceptual diagram illustrating an example quadtree binary tree (QTBT) structure 130, and a corresponding coding tree unit (CTU) 132. The solid lines represent quadtree splitting, and dotted lines indicate binary tree splitting. In each split (i.e., non-leaf) node of the binary tree, one flag is signaled to indicate which splitting type (i.e., horizontal or vertical) is used, where 0 indicates horizontal splitting and 1 indicates vertical splitting in this example. For the quadtree splitting, there is no need to indicate the splitting type, since quadtree nodes split a block horizontally and vertically into 4 sub-blocks with equal size. Accordingly, video encoder 200 may encode, and video decoder 300 may decode, syntax elements (such as splitting information) for a region tree level of QTBT structure 130 (i.e., the solid lines) and syntax elements (such as splitting information) for a prediction tree level of QTBT structure 130 (i.e., the dashed lines). Video encoder 200 may encode, and video decoder 300 may decode, video data, such as prediction and transform data, for CUs represented by terminal leaf nodes of QTBT structure 130.

In general, CTU 132 of FIG. 2B may be associated with parameters defining sizes of blocks corresponding to nodes of QTBT structure 130 at the first and second levels. These parameters may include a CTU size (representing a size of CTU 132 in samples), a minimum quadtree size (MinQTSize, representing a minimum allowed quadtree leaf node size), a maximum binary tree size (MaxBTSize, representing a maximum allowed binary tree root node size), a maximum binary tree depth (MaxBTDepth, representing a maximum allowed binary tree depth), and a minimum binary tree size (MinBTSize, representing the minimum allowed binary tree leaf node size).

The root node of a QTBT structure corresponding to a CTU may have four child nodes at the first level of the QTBT structure, each of which may be partitioned according to quadtree partitioning. That is, nodes of the first level are either leaf nodes (having no child nodes) or have four child nodes. The example of QTBT structure 130 represents such nodes as including the parent node and child nodes having solid lines for branches. If nodes of the first level are not larger than the maximum allowed binary tree root node size (MaxBTSize), they can be further partitioned by respective binary trees. The binary tree splitting of one node can be iterated until the nodes resulting from the split reach the minimum allowed binary tree leaf node size (MinBTSize) or the maximum allowed binary tree depth (MaxBTDepth). The example of QTBT structure 130 represents such nodes as having dashed lines for branches. The binary tree leaf node is referred to as a coding unit (CU), which is used for prediction (e.g., intra-picture or inter-picture prediction) and transform, without any further partitioning. As discussed above, CUs may also be referred to as "video blocks" or "blocks."

In one example of the QTBT partitioning structure, the CTU size is set as 128×128 (luma samples and two corresponding 64×64 chroma samples), the MinQTSize is set as 16×16, the MaxBTSize is set as 64×64, the MinBTSize (for both width and height) is set as 4, and the MaxBTDepth is set as 4. The quadtree partitioning is applied to the CTU first to generate quad-tree leaf nodes. The quadtree leaf nodes may have a size from 16×16 (i.e., the MinQTSize) to 128×128 (i.e., the CTU size). If the leaf quadtree node is 128×128, it will not be further split by the binary tree, since the size exceeds the MaxBTSize (i.e., 64×64, in this example). Otherwise, the leaf quadtree node will be further partitioned by the binary tree. Therefore, the quadtree leaf node is also the root node for the binary tree and has the binary tree depth as 0. When the binary tree depth reaches MaxBTDepth (4, in this example), no further splitting is permitted. When the binary tree node has width equal to MinBTSize (4, in this example), it implies no further horizontal splitting is permitted. Similarly, a binary tree node having a height equal to MinBTSize implies no further vertical splitting is permitted for that binary tree node. As noted above, leaf nodes of the binary tree are referred to as CUs, and are further processed according to prediction and transform without further partitioning.

Figure 3A:
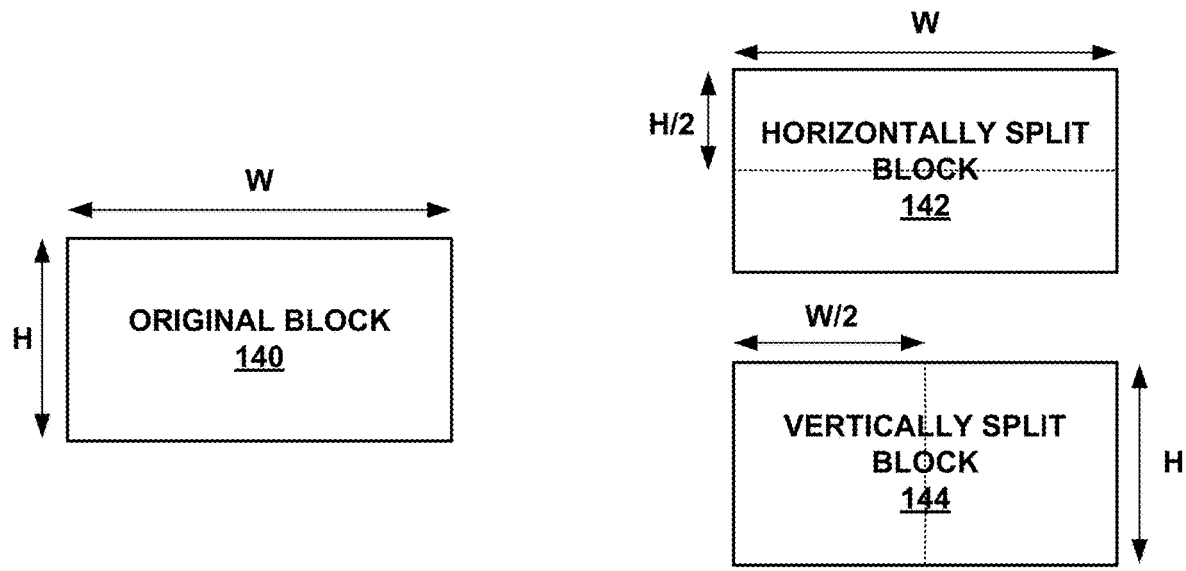
FIGS. 3A and 3B are conceptual diagrams illustrating examples of intra-prediction sub-partitioning of blocks of video data for intra sub-partitioning (ISP) coding mode.
Figure 3B:
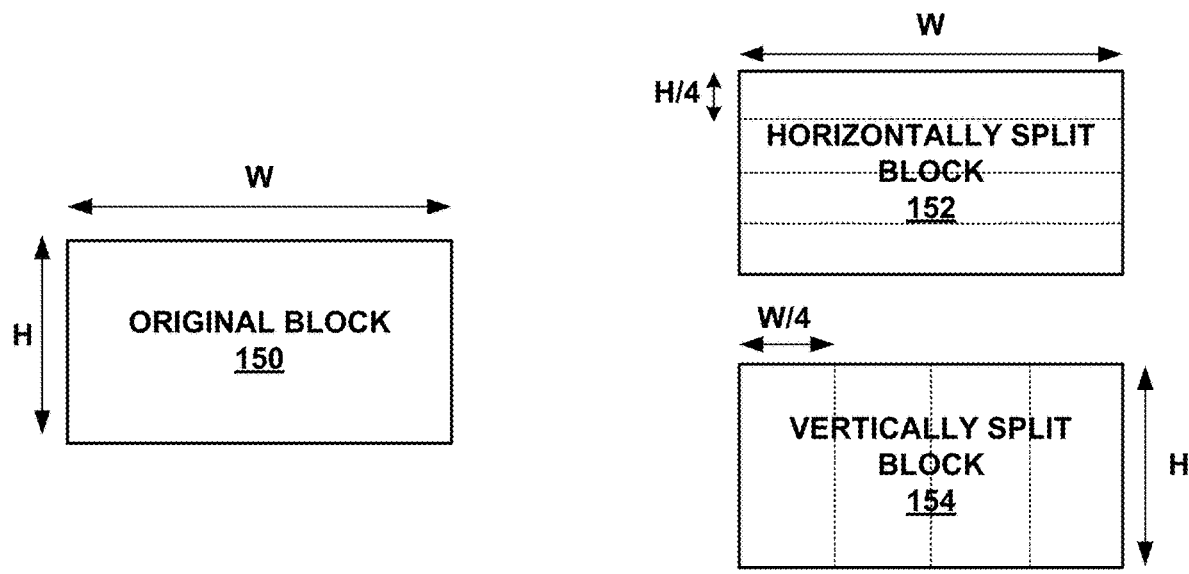

FIGS. 3A and 3B are conceptual diagrams illustrating examples of intra-prediction sub-partitioning of blocks of video data for intra sub-partitioning (ISP) coding mode. ISP coding mode is described in Hernandez et al., "CE3: Line-based intra coding mode," Joint Video Experts Team (JVET) of ITU-T SG 16 WP 3 and ISO/IEC JTC 1/SC 29/WG 11 12th Meeting: Macao, CN, 3-12 Oct. 2018, document JVET-L0076, available at phenix.it-sudparis.eu/jvet/doc_end user/current_document.php?id=4157. This ISP tool divides luma intra-predicted blocks vertically or horizontally into 2 or 4 sub-partitions depending on the block dimensions. Examples of possible sub-partitions are shown in FIGS. 3A and 3B.

In particular, FIG. 3A illustrates original block 140 having a width of W and a height of H. Two example partitionings of original block 140 are shown in FIG. 3A, a horizontally split block 142 and a vertically split block 144. Sub-blocks of horizontally split block 142 have a width of W and a height of H/2. Sub-blocks of vertically split block 144 have a height of H and a width of W/2.

Similarly, FIG. 3B illustrates original block 150 having a width of W and a height of H. Two example partitionings of original block 150 are shown in FIG. 3B, a horizontally split block 152 and a vertically split block 144. Sub-blocks of horizontally split block 152 have a width of W and a height of H/4. Sub-blocks of vertically split block 154 have a height of H and a width of W/4.

According to ISP coding mode, one bit of syntax data is used to signal whether a coding block is split into ISPs, and a second bit of the syntax data is used to indicate the split type: horizontal or vertical. Based on the intra mode and the split type used, two different classes of processing orders may be used, which are referred to as normal and reversed order. In the normal order, the first sub-partition to be processed is the one containing the top-left sample of the CU and then continuing downwards (horizontal split) or rightwards (vertical split). On the other hand, the reverse processing order either starts with the sub-partition containing the bottom-left sample of the CU (horizontal split) and continues upwards, or starts with sub-partition containing the top-right sample of the CU and continues leftwards (vertical split). A variation of ISP that uses only the normal processing order is used in JVET WD4.

One of the benefits of ISP is the shortened distance between a predicted sample and its reference. However, ISP as described in JVET-L0076 only supports horizontal and vertical splits. Thus, the distance may be still high, especially for DC and Planar intra prediction modes. In addition, a single intra-prediction mode is used for all sub blocks in the CU. This may not be beneficial for coding units covering non-homogenous areas.

In accordance with the techniques of this disclosure, video encoder 200 and video decoder 300 may perform extended ISP, which may include other splits beyond only horizontal or vertical splits, and/or use of different intra-prediction modes for different sub-blocks of a CU.

In some examples, video encoder 200 and video decoder 300 may code an intra coded CU that is split into sub-blocks of the same size. The size of each subblock may be expressed as (width/M)×(height/N), where width and height are the width and the height of the CU, respectively. The total number of subblocks in this case is M×N (i.e., M subblock columns and N subblock rows).

Some constraints may be applied to the partitioning, e.g., the number of samples in a subblock may be restricted so as to not be lower than a threshold, the number of subblocks may be restricted so as to not be lower than another threshold, and/or the CU size (width×height or width+height) may be restricted so as to be smaller or greater than another set of thresholds. In general, such restrictions may be implemented by not performing coding that would violate the restrictions, and moreover, not supporting values for syntax elements that would signal a situation that is not permitted according to the restrictions.

In some examples, video encoder 200 and video decoder 300 may be subject to certain constraints on the values of M and N, e.g., according to the coding mode applied to a current block. In one example, M may be set equal to 1 for horizontal intra prediction mode (IPM). In also another example, M may be set equal to 1 for vertical IPM. In some examples, these constraints may also apply to cases where the IPM is close to a horizontal or a vertical mode (e.g., within a certain threshold value from the horizontal or vertical mode, such as in the range of [HOR−x, HOR+x] which include all mode value from HOR−x to HOR+x, inclusive). In some examples, N may be set equal to 1 for horizontal intra prediction mode (IPM). In some examples, N may be set equal to 1 for likely vertical IPM. In some examples, M and N may be set equal to 2 for a non-angular IPM (e.g., DC mode, Planar (PL) mode).

In some examples, the splitting of certain blocks may be restricted to reflect similar constraints. For example, when M=1, only the bit to signal the ISP mode flag may be signaled, and the second bit to indicate horizontal split may not be signalled and inferred to be equal to 1.

In some examples, video encoder 200 and video decoder 300 may determine the constraints on the value of M, N or the split flags for a current block according to one or more characteristics (e.g., ISP split flags, mode values) of neighboring blocks to the current block.

In some examples, video encoder 200 and video decoder 300 may be configured to apply the same intra-prediction mode to all sub-blocks of a current block (e.g., a current CU). Video encoder 200 may determine the intra-prediction mode according to a rate-distortion optimization (RDO) process and encode data representing the resulting intra-prediction mode, while video decoder 300 may decode the data to determine the intra-prediction mode. The intra-prediction mode determined according to the RDO process may be referred to as the "optimal" intra-prediction mode, in the sense that the determined intra-prediction mode demonstrates the best RDO performance among tested intra prediction modes.

Figure 4:
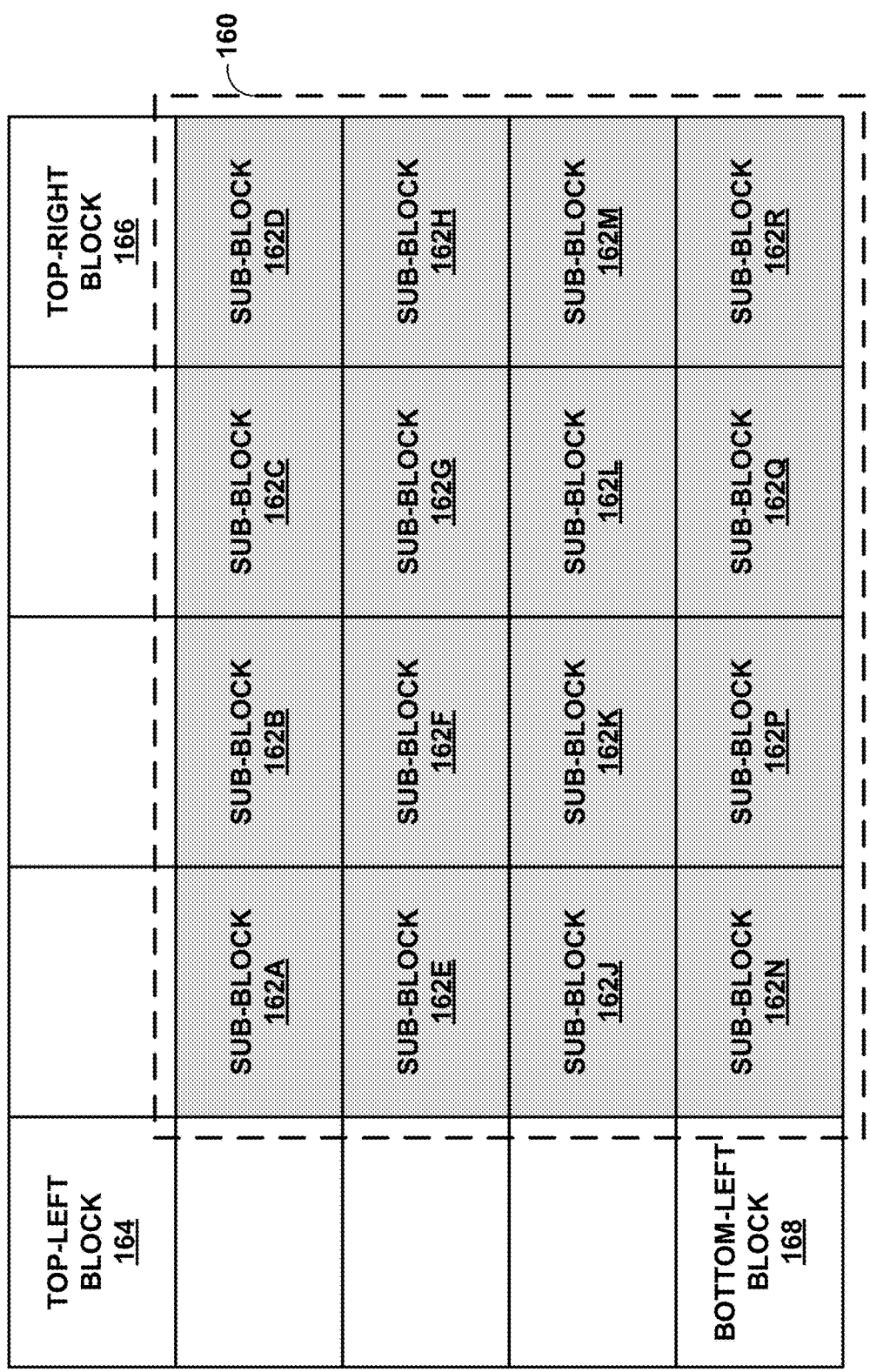
FIG. 4 is a conceptual diagram illustrating control points that may be used to determine an intra-prediction mode (IPM) for a current block of video data.

FIG. 4 is a conceptual diagram illustrating control points that may be used to determine an intra-prediction mode (IPM) for a current block of video data. In particular, FIG. 4 illustrates current block 160 (also referred to as a CU) including sub-blocks 162A-162R (sub-blocks 162). Current block 160 includes CU header data that applies to each of sub-blocks 162. FIG. 4 also illustrates control point blocks including top-left block 164, top-right block 166, and bottom-left block 168.

In some examples, video encoder 200 and video decoder 300 may determine an intra-prediction mode for each of sub-blocks 162 based on positions of sub-blocks 162 within current block 160. For example, video encoder 200 and video decoder 300 may determine the intra-prediction mode of one of sub-blocks 162 at position (x,y) in current block 160 using the intra-prediction modes of top-left block 164, top-right block 166, and bottom-left block 168 according to the formula:

$$IPM_{(x,y)} = ax+by+c,$$

where IPM(x,y) represents the intra-prediction mode of the one of sub-blocks 162 at position (x,y). The values of a, b, and c may represent intra-prediction modes of corresponding control point blocks (e.g., top-left block 164, top-right block 166, and bottom-left block 168).

In one example, video encoder 200 and video decoder 300 may determine the intra-prediction mode of one of sub-blocks 162 at position (x,y) in current block 160 using an affine model, e.g.:

$$IPM_{(x,y)} = \frac{(IPM_{ctrp1} - IPM_{ctrp0})}{\text{width}}x + \frac{(IPM_{ctrp2} - IPM_{ctrp0})}{\text{height}}y + IPM_{ctrp0},$$

where "ctrpN" represents control point N (e.g., one of top-left block 164, top-right block 166, and bottom-left block 168), width represents the width of current block 160, and height represents the height of current block 160.

FIG. 4 represents an example set of control points (top-left block 164, top-right block 166, and bottom-left block 168) that video encoder 200 and video decoder 300 may use to determine intra-prediction modes of sub-blocks 162. In other examples, other numbers and/or positions of control points (e.g., any of the white-shaded neighboring blocks to current block 160) may be used to determine the intra-prediction modes of sub-blocks 162. Also, the above equation does not explicitly specify whether the operations are performed in fixed or floating point operations; it must be understood that these operations may be performed in fixed or floating point operations, or both, with associated additional steps necessary. For example, in floating point operations, the bit depth of the operations may be chosen, and intermediate rounding or clipping operations also performed depending on signaled values or other syntax elements that specify the precision. Similar considerations, including bit depth, may be applicable to fixed point operations also. The above equation uses "x" and "y" (the position of the sub-block) in the equation to derive the affine model; this is just an example and other parameters including, but not limited to, values derived from x, y, and other characteristics of the current block and neighboring blocks, may be used.

Although the above example describes position dependent intra-prediction modes as a modification of how the modes for ISP subblocks are derived, in other examples, video encoder 200 and video decoder 300 may perform this method as an additional mode. For example, a flag may be signalled to indicate whether position dependent IPMs are used for a particular block. In other examples, video encoder 200 and video decoder 300 may derive the flag value according to one or more of the following factors: block shape, size, IPM value of current block 160, and IPM values of one or more neighboring blocks.

In some examples, video encoder 200 and video decoder 300 may derive the IPM for sub-blocks 162 as follows: re-number the intra modes of the control points to only use the angular modes, derive the intra mode using the re-numbered values, and then do the inverse of the re-numbering process to derive the corresponding IPM. In one example, video encoder 200 and video decoder 300 may perform the following re-numbering process:

Let the intra modes be defined in the range of [−K1, K2] with PL and DC modes corresponding to mode values 0 and 1, respectively. The re-numbered mode, R(x) for an angular intra mode x may be defined as:

$$R(x)=(x<0)?x:(x-2)$$

Note that in this example, PL and DC are considered non-angular modes. Let Wx be the re-numbered intra mode derived for a subblock. The corresponding IPM, x_derived, is derived using inverse of the re-numbering process as follows:

$$x\_derived=(Wx-0)?Wx:(Wx+2)$$

Figure 5B:
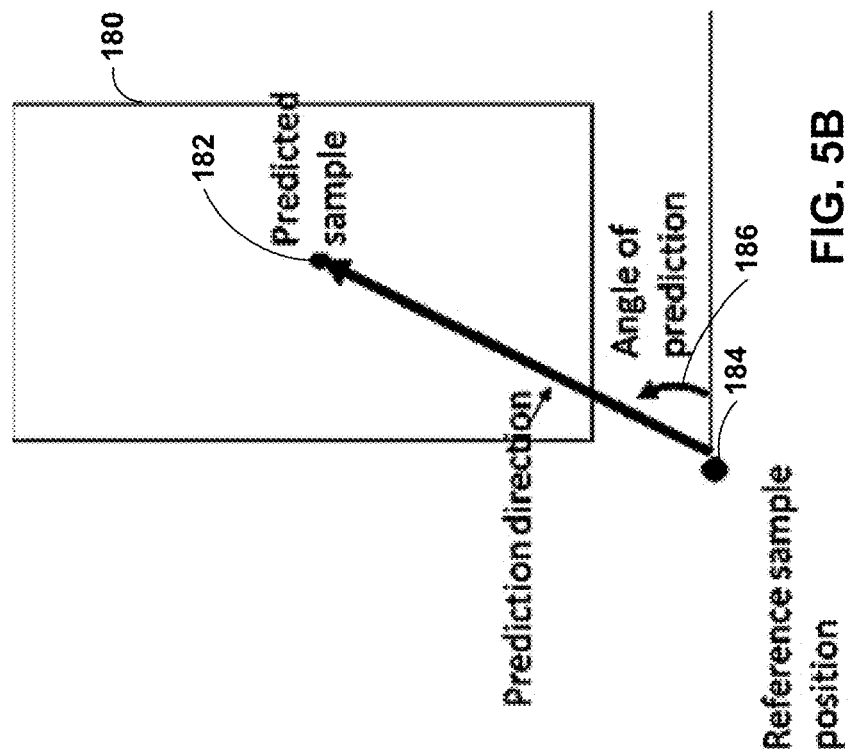
FIGS. 5A and 5B are conceptual diagrams illustrating examples of prediction directions associated with predicted samples.
Figure 5A:
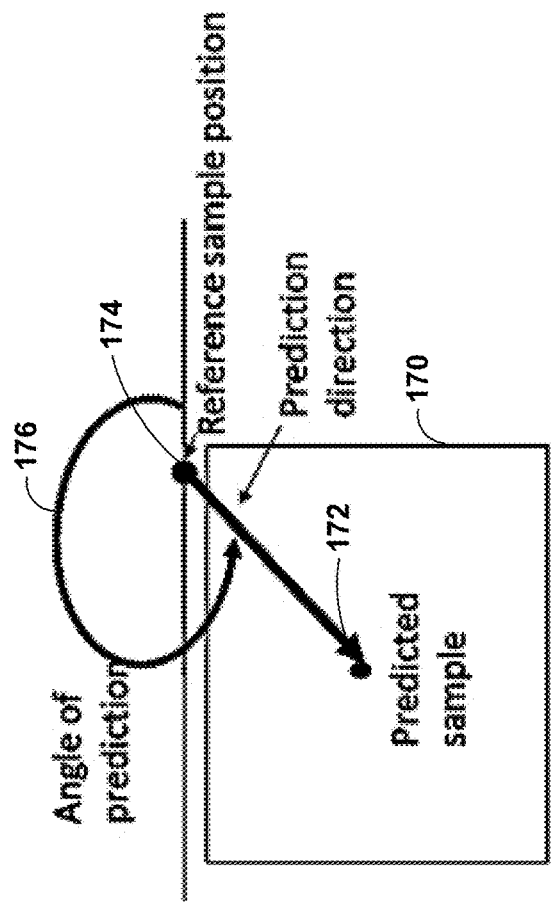

FIGS. 5A and 5B are conceptual diagrams illustrating examples of prediction directions associated with predicted samples. In some examples, video encoder 200 and video decoder 300 may derive the intra-prediction mode of one of sub-blocks 162 by associating an angle of prediction to an intra-prediction mode. In this case, for each IPM M, a corresponding angle equal to Ang(M) is considered. The Ang(M) may be obtained as the angle of prediction, formed by the horizontal axis and line joining the reference sample and predicted sample. FIGS. 5A and 5B provide two examples of the angle for two mode values.

The example of FIG. 5A illustrates a current sub-block 170 and the IPM is 66 (in JVET WD4). The angle corresponding to this IPM (that is, angle of prediction 176) is 135°. Thus, prediction sample 172 of current sub-block 170 is predicted from reference sample 174.

The example of FIG. 5B illustrates current sub-block 180 with a mode value of 72 (note that in JVET WD4, the signaled mode value to indicate this mode may be different and the value 72 may be derived) and angle of prediction 186 is approximately 63° (inverse tan of 2, assuming that the block height is twice the block width). Thus, prediction sample 182 of current sub-block 180 is predicted from reference sample 184. In other examples, the angle of prediction may be defined using a reference different than that shown in the figure (where positive horizontal axis is used).

The IPM derivation for the subblock may be updated as follows:

$$Ang(IPM_{(x,y)}) = \frac{(Ang(IPM_{ctrp1}) - Ang(IPM_{ctrp0}))}{width}x + \frac{(Ang(IPM_{ctrp2}) - Ang(IPM_{ctrp0}))}{height}y + Ang(IPM_{ctrp0})$$

The derivation of the Ang( ) may be derived from IPM using an equation, or look-up tables (LUTs) may be specified or signaled for the derivation. An example of an equation to Ang(M) is given below. This example has a combination of Ang( ) derivation with re-numbering of modes described earlier in this document; it may be understood that Ang( ) derivation may also be defined without re-numbering of modes:

Let R(x) be a re-numbered value of mode x. Ang(x) may be defined as Ang(x)={R(x)−r0}*angScale+angOffset, where r0 represents a mode offset, angScale represents a scale value to convert the mode to angle, and angOffset is an angle offset.

This derivation above assumes that the angles used in intra prediction sampled uniformly to the R(x) values. In other instances, other functions of the angle, e.g. tan( ), cot( ), etc. of the angle of prediction may be uniformly sampled to the mode values. An example of equation in such a case may be as follows:

tan Ang={R(x)−r0}*scale+offset,

Ang(x)=tan$^{-1}$(tan Ang)+angOffset2

More generally, techniques described in this method may apply to any generalized relation between the angle of prediction and IPM, including non-linear functions to derive angle from IPM.

In some cases, the Ang( ) derivation may also be dependent on blocks shapes and block sizes. For example, when the block shapes are rectangular, the range of angles allowed for IPM may be different. This may result in different parameters (e.g., angScale, angOffset) for different blocks shapes.

When signaled as LUTs, the precision of the LUT entries, the sampling of the IPM values used to specify the LUTs, may all be selected based on the particular requirement of the codec. In other examples, these values may also be signaled in the bitstream.

Furthermore, an inverse process for deriving the IPM from the angle of prediction may be defined corresponding to the methods above.

It should be clear that angles can be expressed in degrees, radians, or other system that is suitable for the mathematical derivations.

In other examples, when one or more of the control points are coded with a non-angular mode (e.g., PL, DC), the IPM for the subblocks may be defined using a different method. For example, the following rules may be applied:

1. If the number of control points encoded with Planar exceeds a threshold value T1, all the subblocks are also coded with the Planar mode.
2. Else, if the number of control points encoded with DC exceeds a threshold value T2, all the subblocks are also coded with the DC mode.
3. Else, the subblocks are coded with the same IPM associated with the nearest control point.

The values of the thresholds T1 and T2 may be predefined or signaled in the bitstream. The values may be defined based on the block characteristic (e.g., values of T1 and T2 may be defined as a function of the block width and block height, such as the aspect ratio width/height or the sum width+height).

In some embodiments, the subblock is coded with an IPM that is associated with one of the control points that is closest in terms of distance (e.g., Euclidean, Manhattan) to a representative sample of the subblock. A representative sample of a subblock, in this instance, refers to a sample contained in the subblock (e.g., the center sample of the subblock) that is used to measure the distance of the subblock from a control point.

In one example, a sample other than the center sample of the subblock may be chosen as the representative sample. For example, the top-left sample may be used.

In other examples, a subblock may have a different representative sample selected for each control point. For example, for top-left, top-right, and bottom-left control points, the corresponding representative samples may be the top-left, top-right, and bottom-left samples, respectively, of the subblock.

In another example, a distance measure other than the Euclidean distance may be used to determine the distance of the control point from the subblock. For example, the Manhattan distance may be used.

In some examples, the distance may be measured in units of samples, while in other examples, distance may be measured in units of a block size (e.g., minimum PU block size, minimum TU block size), in units of blocks (e.g., subblock), or other units that may be applicable to the current coding unit. The units used may be different for the horizontal and the vertical components.

In some examples, when one or more control points may be at similar distance from a subblock, the prediction for the subblock may be derived as follows. A control-point set (CPS) of a subblock may be defined as a set of control points associated with the subblock that satisfy a distance criterion.

In one example, the distance criterion is satisfied by one or more control points that is the closest to the subblock in terms of distance.

In another example, the distance criterion is satisfied by one or more control points that have a distance less than a particular threshold value to the subblock.

In another example, the distance criterion is satisfied by one or more control points that have a distance between two threshold values to the subblock.

A subblock may be associated with a CPS. When only one control point is present in the CPS, the IPM of the control point (or a value derived from the IPM of the control point) may be used as the IPM associated with the subblock. When more than one control point is present in a CPS, a determination may be made of the IPM of the subblock. Some examples of the determinations include the following: a value derived from the weighted average of the IPM of the control points in the CPS (e.g., simple average); a value derived by an affine model of the IPMs of the control points in the CPS; defining a priority order of modes among the IPMs of the control points in the CPS (e.g., a PL mode, if present, may be considered the most dominant mode among the IPMs, followed by DC, HOR, VER, etc. The determination of priority order may also include consideration of frequency of the occurrence of a particular mode among the IPMs of the control points in the CPS).

In some examples, the position dependent IPM scheme may be applied even when ISP is not used. For example, the IPM for a CU may be derived using a model based on the IPM of one or more control points in the neighborhood of the CU.

In some examples, when a CU is to be coded using ISP, video encoder 200 may test the identical IPM scheme and the position dependent IPM scheme using an RDO process. Video encoder 200 may select the scheme resulting in the best RDO performance to encode the CU, and signal a bit representing the selected scheme. This bit may be signaled using a context or bypass encoder. When identical IPM scheme is selected, video encoder 200 may encode data representing the best IPM. Once a flag is used to indicate whether a mode is used, this flag may be coded using a context, or bypass, etc. When position dependent IPM is selected, the IPM of each subblock may be derived using the techniques discussed above.

Figure 6:
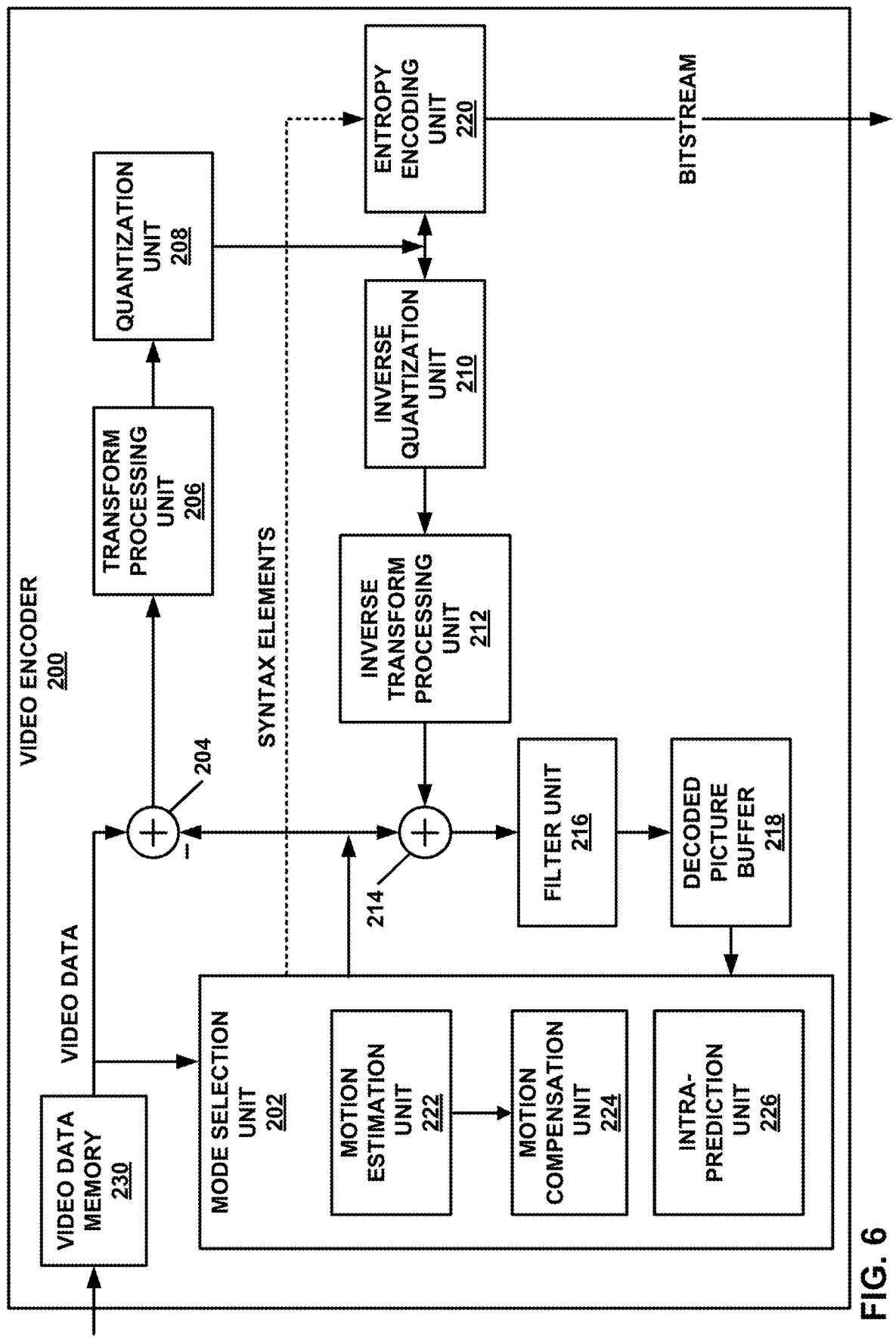
FIG. 6 is a block diagram illustrating an example video encoder that may perform the techniques of this disclosure.

FIG. 6 is a block diagram illustrating an example video encoder 200 that may perform the techniques of this disclosure. FIG. 6 is provided for purposes of explanation and should not be considered limiting of the techniques as broadly exemplified and described in this disclosure. For purposes of explanation, this disclosure describes video encoder 200 in the context of video coding standards such as the HEVC video coding standard and the H.266 video coding standard in development. However, the techniques of this disclosure are not limited to these video coding standards, and are applicable generally to video encoding and decoding.

In the example of FIG. 6, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 6 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more of the units may be distinct circuit blocks (fixed-function or programmable), and in some examples, the one or more units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the object code of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the QTBT structure or the quad-tree structure of HEVC described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

In accordance with the techniques of this disclosure, mode select unit 202 may select an ISP coding mode, and intra-prediction modes for sub-blocks according to the ISP coding mode, as discussed above. Intra-prediction unit 226 may then form prediction blocks for sub-blocks of a current CU using the respective selected intra-prediction modes. Mode select unit 202 may also provide values for syntax elements representing the ISP coding mode and/or intra-prediction modes for the sub-blocks to entropy encoding unit 220.

Mode selection unit 202 provides the prediction block to residual generation unit 204. Residual generation unit 204 receives a raw, uncoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

In some examples, according to the techniques of this disclosure, mode selection unit 202 may partition a CU into sub-blocks that are arranged into a number of rows and columns greater than 1, e.g., N rows and M columns where N and M are each greater than 1. Mode selection unit 202 may further cause intra prediction unit 226 to form intra-prediction blocks for each of the sub-blocks. The sub-blocks may be distinct from PUs as in HEVC, in that video encoder 200 may avoid coding prediction unit syntax information for the sub-blocks as in HEVC. For example, rather than signaling intra-prediction modes for each of the sub-blocks, video encoder 200 may signal a single intra-prediction mode for the CU, but determine individual intra-prediction modes for the sub-blocks based on the signaled intra-prediction mode, intra-prediction modes of neighboring blocks (e.g., control point blocks) to the CU relative to positions of the sub-blocks, a size of the CU, and/or other criteria.

For other video coding techniques such as an intra-block copy mode coding, an affine-mode coding, and linear model (LM) mode coding, as few examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

Video encoder 200 stores reconstructed blocks in DPB 218. For instance, in examples where operations of filter unit 216 are not needed, reconstruction unit 214 may store reconstructed blocks to DPB 218. In examples where operations of filter unit 216 are needed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding blocks and the chroma coding blocks.

In this manner, video encoder 200 of FIG. 6 represents an example of a device for coding video data that includes a memory configured to store video data; and one or more processors implemented in circuitry and configured to: partition a coding unit (CU) of video data into sub-blocks, the sub-blocks being arranged into a number of rows and a number of columns, the number of rows being greater than 1 and the number of columns being greater than 1; form intra-prediction blocks for each of the sub-blocks; and code the CU using the intra-prediction blocks.

Figure 7:
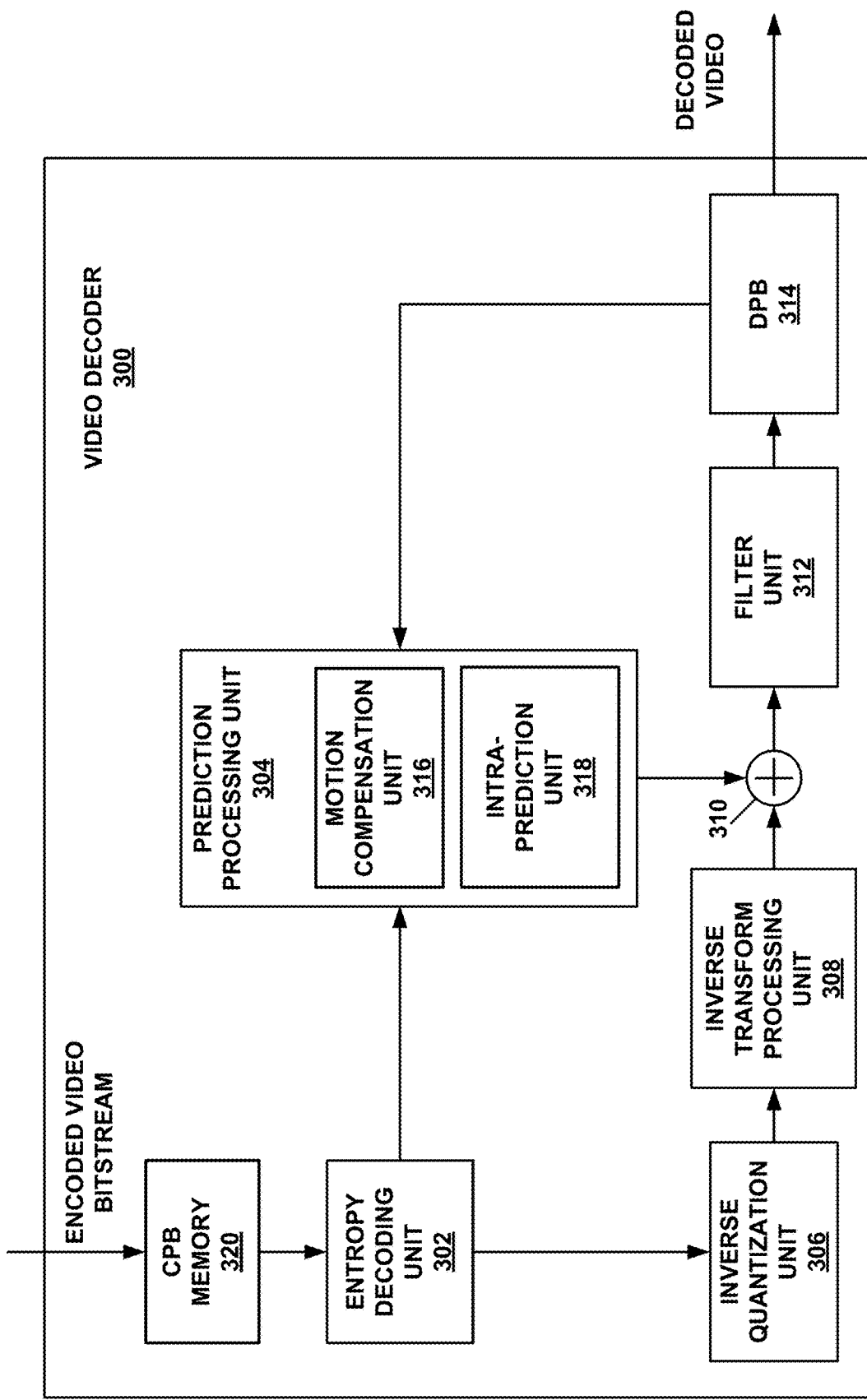
FIG. 7 is a block diagram illustrating an example video decoder that may perform the techniques of this disclosure.

FIG. 7 is a block diagram illustrating an example video decoder 300 that may perform the techniques of this disclosure. FIG. 7 is provided for purposes of explanation and is not limiting on the techniques as broadly exemplified and described in this disclosure. For purposes of explanation, this disclosure describes video decoder 300 is described according to the techniques of JEM, VVC, and HEVC. However, the techniques of this disclosure may be performed by video coding devices that are configured to other video coding standards.

In the example of FIG. 7, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. Moreover, video decoder 300 may include additional or alternative processors or processing circuitry to perform these and other functions.

Prediction processing unit 304 includes motion compensation unit 316 and intra-prediction unit 318. Prediction processing unit 304 may include addition units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as dynamic random access memory (DRAM), including synchronous DRAM (SDRAM), magnetoresistive RAM (MRAM), resistive RAM (RRAM), or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to executed by processing circuitry of video decoder 300.

The various units shown in FIG. 7 are illustrated to assist with understanding the operations performed by video decoder 300. The units may be implemented as fixed-function circuits, programmable circuits, or a combination thereof. Similar to FIG. 6, fixed-function circuits refer to circuits that provide particular functionality, and are preset on the operations that can be performed. Programmable circuits refer to circuits that can programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more of the units may be distinct circuit blocks (fixed-function or programmable), and in some examples, the one or more units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 6).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 6). Intra-prediction unit 318 may retrieve data of neighboring samples to the current block from DPB 314. In accordance with the techniques of this disclosure, intra-prediction unit 318 may form intra-prediction blocks for sub-blocks of a CU using respectively determined intra-prediction modes, when the CU is ISP-coded. For example, entropy decoding unit 302 may send data representing the intra-prediction modes for the sub-blocks to prediction processing unit 304, as well as data representing how the CU is partitioned into the sub-blocks (e.g., a number of rows and columns of sub-blocks for the CU).

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures from DPB for subsequent presentation on a display device, such as display device 118 of FIG. 1.

In this manner, video decoder 300 of FIG. 7 represents an example of a device for coding video data that includes a memory configured to store video data; and one or more processors implemented in circuitry and configured to: partition a coding unit (CU) of video data into sub-blocks, the sub-blocks being arranged into a number of rows and a number of columns, the number of rows being greater than 1 and the number of columns being greater than 1; form intra-prediction blocks for each of the sub-blocks; and code the CU using the intra-prediction blocks.

Figure 8:
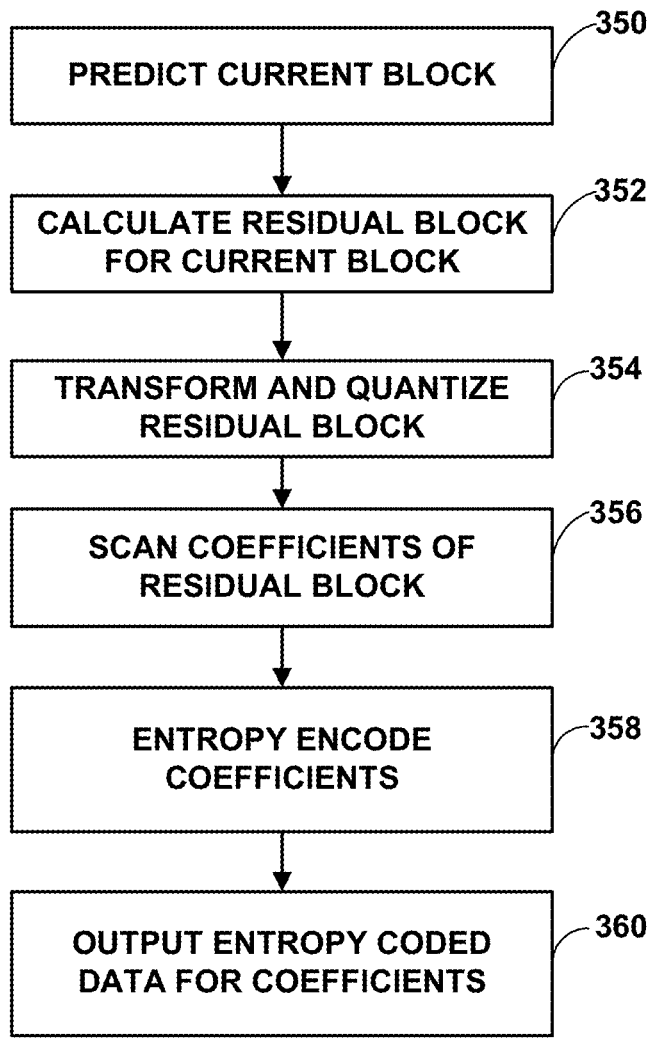
FIG. 8 is a flowchart illustrating an example method for encoding a current block in accordance with the techniques of this disclosure.

FIG. 8 is a flowchart illustrating an example method for encoding a current block in accordance with the techniques of this disclosure. The current block may comprise a current CU. Although described with respect to video encoder 200 (FIGS. 1 and 6), it should be understood that other devices may be configured to perform a method similar to that of FIG. 8.

In this example, video encoder 200 initially predicts the current block (350). For example, video encoder 200 may form a prediction block for the current block. In particular, according to the techniques of this disclosure, video encoder 200 may partition a coding unit (CU) into a plurality of sub-blocks (e.g., M×N sub-blocks, where M and N may be greater than 1), and form intra-prediction blocks for each of the sub-blocks using respective intra-prediction modes (which may be different for different sub-blocks). Video encoder 200 may then calculate one or more residual blocks for the current block (352). To calculate the residual blocks, video encoder 200 may calculate one or more differences between the original, uncoded block and the intra-prediction blocks for the current block. Video encoder 200 may then transform and quantize coefficients of the residual blocks (354). Next, video encoder 200 may scan the quantized transform coefficients of the residual blocks (356). During the scan, or following the scan, video encoder 200 may entropy encode the coefficients (358). For example, video encoder 200 may encode the coefficients using CAVLC or CABAC. Video encoder 200 may then output the entropy coded data of the block (360).

In this manner, the method of FIG. 8 represents an example of a method of coding video data including partitioning a coding unit (CU) of video data into sub-blocks, the sub-blocks being arranged into a number of rows and a number of columns, the number of rows being greater than 1 and the number of columns being greater than 1; forming intra-prediction blocks for each of the sub-blocks; and coding the CU using the intra-prediction blocks.

Figure 9:
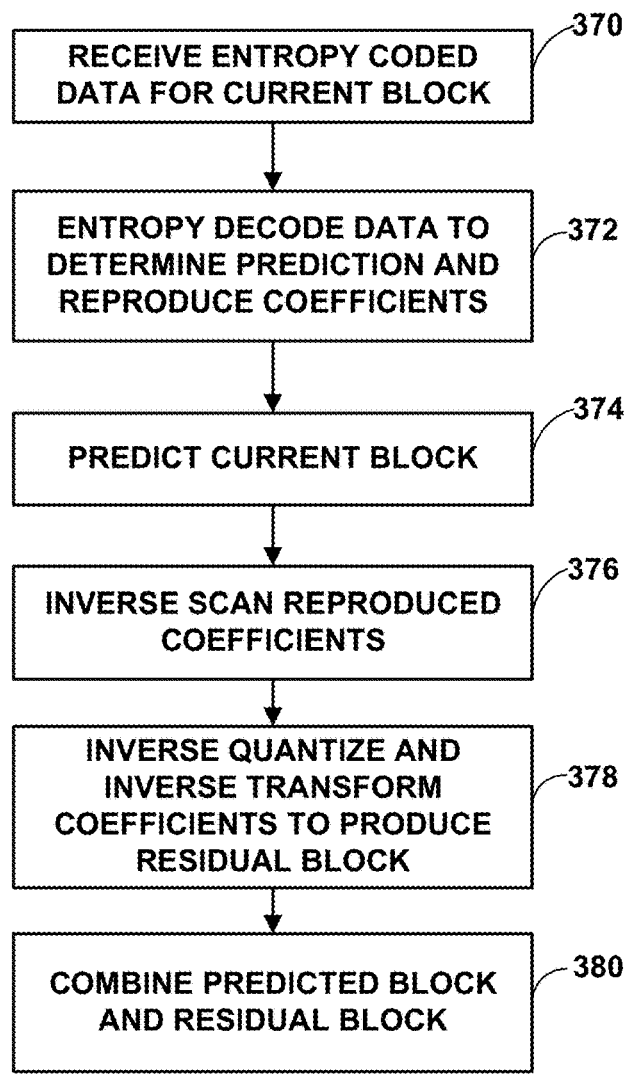
FIG. 9 is a flowchart illustrating an example method for decoding a current block in accordance with the techniques of this disclosure.

FIG. 9 is a flowchart illustrating an example method for decoding a current block in accordance with the techniques of this disclosure. The current block may comprise a current CU. Although described with respect to video decoder 300 (FIGS. 1 and 7), it should be understood that other devices may be configured to perform a method similar to that of FIG. 9.

Video decoder 300 may receive entropy coded data for the current block, such as entropy coded prediction information and entropy coded data for coefficients of a residual block corresponding to the current block (370). Video decoder 300 may entropy decode the entropy encoded data to determine prediction information for the current block and to reproduce coefficients of the residual block (372). Video decoder 300 may predict the current block (374), e.g., using an intra- or inter-prediction mode as indicated by the prediction information for the current block, to calculate an intra-prediction block for the current block. In particular, according to the techniques of this disclosure, video decoder 300 may partition a coding unit (CU) into a plurality of sub-blocks (e.g., M×N sub-blocks, where M and N may be greater than 1), and form intra-prediction blocks for each of the sub-blocks using respective intra-prediction modes (which may be different for different sub-blocks). Video decoder 300 may then inverse scan the reproduced coefficients (376), to create one or more blocks of quantized transform coefficients. Video decoder 300 may then inverse quantize and inverse transform the coefficients to produce one or more residual blocks (378). Video decoder 300 may ultimately decode the current block by combining the intra-prediction blocks and the residual blocks (380).

In this manner, the method of FIG. 9 represents an example of a method of coding video data including partitioning a coding unit (CU) of video data into sub-blocks, the sub-blocks being arranged into a number of rows and a number of columns, the number of rows being greater than 1 and the number of columns being greater than 1; forming intra-prediction blocks for each of the sub-blocks; and coding the CU using the intra-prediction blocks.

Figure 10:
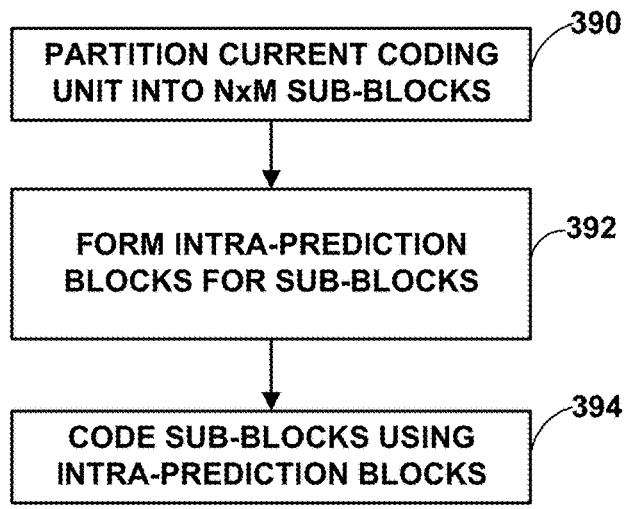
FIG. 10 is a flowchart illustrating an example method of coding video data according to the techniques of this disclosure.

FIG. 10 is a flowchart illustrating an example method of coding video data according to the techniques of this disclosure. The method of FIG. 10 may be performed by a video coder, such as video encoder 200 of FIGS. 1 and 6 or video decoder 300 of FIGS. 1 and 7. Moreover, the method of FIG. 10 may be performed as part of the encoding method of FIG. 8, e.g., steps 350, 352, and 358, or as part of the decoding method of FIG. 9, e.g., steps 372, 374, and 378. For purposes of example and explanation, the method of FIG. 10 is explained with respect to video decoder 300 of FIGS. 1 and 7.

Initially, video decoder 300 may partition a current coding unit (CU) into N×M sub-blocks (390). N and M may each be larger than 1. Video decoder 300 may then form intra-prediction blocks for each of the sub-blocks (392). For example, video decoder 300 may use respective intra-prediction modes to form the intra-prediction blocks for each of the sub-blocks. That is, each of the sub-blocks may have its own respective intra-prediction mode. Video decoder 300 may determine the respective intra-prediction modes as discussed above, e.g., based on a size of the current CU, dimensions of the current CU (e.g., whether a height is greater than a width or vice versa), prediction modes of neighboring blocks to the current CU (e.g., as explained with respect to FIG. 4 above), or the like.

Video decoder 300 may further code the sub-blocks (and thereby code the current CU) using the respective intra-prediction blocks (394). For example, when decoding the current CU, video decoder 300 may combine residual blocks with the intra-prediction blocks on a sample-by-sample basis. During an encoding method, video encoder 200 may calculate sample-by-sample differences between the current CU and the intra-prediction blocks, then encode the resulting residual blocks as discussed above.

In this manner, the method of FIG. 10 represents an example of a method of coding video data including partitioning a coding unit (CU) of video data into sub-blocks, the sub-blocks being arranged into a number of rows and a number of columns, the number of rows being greater than 1 and the number of columns being greater than 1; forming intra-prediction blocks for each of the sub-blocks; and coding the CU using the intra-prediction blocks.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of coding video data, the method comprising:
   partitioning a coding unit (CU) of video data into sub-blocks, the sub-blocks being arranged into a number of rows and a number of columns, the number of rows being greater than 1 and the number of columns being greater than 1;
determining a first intra-prediction mode for a first one of the sub-blocks as being the same as an intra-prediction mode for a first control point block to the CU having a closest distance between a representative sample of the first one of the sub-blocks and the first control point block;
determining a second intra-prediction mode for a second one of the sub-blocks as being the same as an intra-prediction mode for a second control point block to the CU having a closest distance between a representative sample of the second one of the sub-blocks and the second control point block;
forming intra-prediction blocks for each of the sub-blocks, comprising forming a first intra-prediction block for the first one of the sub-blocks using the first intra-prediction mode and forming a second intra-prediction block for the second one of the sub-blocks using the second intra-prediction mode; and
coding the CU using the intra-prediction blocks.

2. The method of claim 1, wherein partitioning the CU comprises preventing partitioning of one of the sub-blocks of the CU when partitioning of the one of the sub-blocks into child sub-blocks would cause the child sub-blocks to have fewer than a threshold number of samples.

3. The method of claim 1, further comprising determining the number of rows and the number of columns such that the number of rows times the number of columns is greater than or equal to a threshold.

4. The method of claim 1, wherein a size of the sub-blocks is greater than a threshold.

5. The method of claim 1, wherein a size of the sub-blocks is less than a threshold.

6. The method of claim 1, wherein a size of the sub-blocks is equal to a width of the sub-blocks times a height of the sub-blocks.

7. The method of claim 1, wherein a size of the sub-blocks is equal to a width of the sub-blocks plus a height of the sub-blocks.

8. The method of claim 1, further comprising determining the number of rows and the number of columns according to an intra-prediction mode used to form the intra-prediction blocks.

9. The method of claim 8, wherein determining the number of rows and the number of columns comprises determining the number of rows to be 2 and the number of columns to be 2 when the intra-prediction mode is a non-angular intra-prediction mode.

10. The method of claim 9, wherein the non-angular intra-prediction mode comprises one of DC mode or planar mode.

11. The method of claim 1, wherein the CU comprises a first CU, the method further comprising partitioning a second CU to have exactly one column of sub-blocks when the second CU is predicted using a horizontal intra-prediction mode.

12. The method of claim 11, wherein the horizontal intra-prediction mode is either exactly horizontal or is within a threshold angle of horizontal.

13. The method of claim 11, further comprising coding a first syntax element representing that the second CU is partitioned into the sub-blocks without coding data for a second syntax element representing a number of columns for the second CU.

14. The method of claim 1, wherein the CU comprises a first CU, the method further comprising partitioning a second CU to have exactly one row of sub-blocks when the second CU is predicted using a vertical intra-prediction mode.

15. The method of claim 14, wherein the vertical intra-prediction mode is either exactly vertical or is within a threshold angle of vertical.

16. The method of claim 14, further comprising coding a first syntax element representing that the second CU is partitioned into the sub-blocks without coding data for a second syntax element representing a number of rows for the second CU.

17. A method of coding video data, the method comprising:
partitioning a coding unit (CU) of video data into sub-blocks, the sub-blocks being arranged into a number of rows and a number of columns, the number of rows being greater than 1 and the number of columns being greater than 1;
determining a first intra-prediction mode based on intra-prediction modes of one or more control point blocks comprising neighboring blocks to the CU and a first position of a first one of the sub-blocks according to the formula: $IPM_{(x,y)} = ax+by+c$, wherein IPM(x,y) represents the intra-prediction mode of the sub-block at position (x,y) in the CU, and wherein a, b, and c represent intra-prediction modes of the control point blocks;
determining a second intra-prediction mode based on the intra-prediction modes of the one or more control point blocks and a second position of a second one of the sub-blocks, the second intra-prediction mode being different than the first intra-prediction mode, wherein determining the second intra-prediction mode comprises determining the second intra-prediction mode according to the formula $IPM_{(x,y)} = ax+by+c$;
forming intra-prediction blocks for each of the sub-blocks, including forming a first intra-prediction block for the first one of the sub-blocks using the first intra-prediction mode and forming a second intra-prediction block for the second one of the sub-blocks using the second intra-prediction mode; and
coding the CU using the intra-prediction blocks.

18. A method of coding video data, the method comprising:
partitioning a coding unit (CU) of video data into sub-blocks, the sub-blocks being arranged into a number of rows and a number of columns, the number of rows being greater than 1 and the number of columns being greater than 1;
determining a first intra-prediction mode based on intra-prediction modes of one or more control point blocks comprising neighboring blocks to the CU and a first position of a first one of the sub-blocks, wherein determining the first intra-prediction mode comprises determining the first intra-prediction mode according to the formula $$IPM_{(x,y)} = \frac{(IPM_{ctrp1} - IPM_{ctrp0})}{width}x + \frac{(IPM_{ctrp2} - IPM_{ctrp0})}{height}y + IPM_{ctrp0},$$

wherein IPM(x,y) represents the intra-prediction mode of the height sub-block at position (x,y) in the CU, wherein IPM$_{ctrpN}$ represents the intra-prediction mode of the N$^{th}$ control point, wherein width represents a width of the CU, and wherein height represents a height of the CU;

determining a second intra-prediction mode based on the intra-prediction modes of the one or more control point blocks and a second position of a second one of the sub-blocks, the second intra-prediction mode being different than the first intra-prediction mode, wherein determining the second intra-prediction mode comprises determining the second intra-prediction mode according to the formula $$IPM_{(x,y)} = \frac{(IPM_{ctrp1} - IPM_{ctrp0})}{width}x + \frac{(IPM_{ctrp2} - IPM_{ctrp0})}{height}y + IPM_{ctrp0};$$

forming intra-prediction blocks for each of the sub-blocks, including forming a first intra-prediction block for the first one of the sub-blocks using the first intra-prediction mode and forming a second intra-prediction block for the second one of the sub-blocks using the second intra-prediction mode; and coding the CU using the intra-prediction blocks.

19. A method of coding video data, the method comprising:

partitioning a coding unit (CU) of video data into sub-blocks, the sub-blocks being arranged into a number of rows and a number of columns, the number of rows being greater than 1 and the number of columns being greater than 1;

determining a first intra-prediction mode for a first one of the sub-blocks and determining a second intra-prediction mode for a second one of the sub-blocks according to the formula $$Ang(IPM_{(x,y)}) = \frac{(Ang(IPM_{ctrp1}) - Ang(IPM_{ctrp0}))}{width}x + \frac{(Ang(IPM_{ctrp2}) - Ang(IPM_{ctrp0}))}{height}y + Ang(IPM_{ctrp0}),$$

wherein Ang(IPM(x,y)) represents an angle of height an intra-prediction mode of a sub-block at position (x,y) in the CU, Ang(IPM$_{ctrpN}$) represents an angle of an intra-prediction mode of an N$^{th}$ control point block for the CU, width represents a width of the CU, and height represents a height of the CU;

forming intra-prediction blocks for each of the sub-blocks, including forming a first intra-prediction block for the first one of the sub-blocks using the first intra-prediction mode and forming a second intra-prediction block for the second one of the sub-blocks using the second intra-prediction mode; and coding the CU using the intra-prediction blocks.

20. The method of claim 1, further comprising determining the first intra-prediction mode and determining the second intra-prediction mode to be a non-angular mode when one or more of the control point blocks to the CU are predicted using a non-angular mode.

21. The method of claim 1, wherein coding the CU comprises decoding the CU, comprising:

decoding one or more residual blocks for the CU; and combining the residual blocks with the intra-prediction blocks.

22. The method of claim 1, wherein coding the CU comprises encoding the CU, comprising:

subtracting the intra-prediction blocks from the CU to form one or more residual blocks; and encoding the one or more residual blocks.

23. The method of claim 22, further comprising determining one or more intra-prediction modes for forming the intra-prediction blocks using rate distortion optimization (RDO), and encoding data representing the intra-prediction modes.

24. The method of claim 22, further comprising determining to encode the CU according to an intra sub-partition (ISP) mode using rate-distortion optimization (RDO), and encoding data indicating that the CU is encoded using the ISP mode.

25. A device for coding video data, the device comprising:
a memory configured to store video data; and
one or more processors implemented in circuitry and configured to:
partition a coding unit (CU) of video data into sub-blocks, the sub-blocks being arranged into a number of rows and a number of columns, the number of rows being greater than 1 and the number of columns being greater than 1;
determine a first intra-prediction mode for a first one of the sub-blocks as being the same as an intra-prediction mode for a first control point block to the CU having a closest distance between a representative sample of the first one of the sub-blocks and the first control point block;
determine a second intra-prediction mode for a second one of the sub-blocks as being the same as an intra-prediction mode for a second control point block to the CU having a closest distance between a representative sample of the second one of the sub-blocks and the second control point block;
form intra-prediction blocks for each of the sub-blocks, wherein to form the intra-prediction blocks, the one or more processors are configured to form a first intra-prediction block for the first one of the sub-blocks using the first intra-prediction mode and form a second intra-prediction block for the second one of the sub-blocks using the second intra-prediction mode; and
code the CU using the intra-prediction blocks.

26. A device for coding video data, the device comprising:
means for partitioning a coding unit (CU) of video data into sub-blocks, the sub-blocks being arranged into a number of rows and a number of columns, the number of rows being greater than 1 and the number of columns being greater than 1;
means for determining a first intra-prediction mode for a first one of the sub-blocks as being the same as an intra-prediction mode for a first control point block to the CU having a closest distance between a representative sample of the first one of the sub-blocks and the first control point block;
means for determining a second intra-prediction mode for a second one of the sub-blocks as being the same as an intra-prediction mode for a second control point block to the CU having a closest distance between a representative sample of the second one of the sub-blocks and the second control point block;
means for forming intra-prediction blocks for each of the sub-blocks, including means for forming a first intra-prediction block for the first one of the sub-blocks using the first intra-prediction mode and means for forming a second intra-prediction block for the second one of the sub-blocks using the second intra-prediction mode; and means for coding the CU using the intra-prediction blocks.

27. A non-transitory computer-readable storage medium having stored thereon instructions that, when executed, cause a processor to:
partition a coding unit (CU) of video data into sub-blocks, the sub-blocks being arranged into a number of rows and a number of columns, the number of rows being greater than 1 and the number of columns being greater than 1;
determine a first intra-prediction mode for a first one of the sub-blocks as being the same as an intra-prediction mode for a first control point block to the CU having a closest distance between a representative sample of the first one of the sub-blocks and the first control point block;
determine a second intra-prediction mode for a second one of the sub-blocks as being the same as an intra-prediction mode for a second control point block to the CU having a closest distance between a representative sample of the second one of the sub-blocks and the second control point block;
form intra-prediction blocks for each of the sub-blocks, including instructions that cause the processor to form a first intra-prediction block for the first one of the sub-blocks using the first intra-prediction mode and form a second intra-prediction block for the second one of the sub-blocks using the second intra-prediction mode; and
code the CU using the intra-prediction blocks.

28. A device for coding video data, the device comprising:
a memory configured to store video data; and
one or more processors implemented in circuitry and configured to:
partition a coding unit (CU) of video data into sub-blocks, the sub-blocks being arranged into a number of rows and a number of columns, the number of rows being greater than 1 and the number of columns being greater than 1;
determine a first intra-prediction mode based on intra-prediction modes of one or more control point blocks comprising neighboring blocks to the CU and a first position of a first one of the sub-blocks according to the formula: $IPM_{(x,y)} = ax+by+c$, wherein $IPM(x,y)$ represents the intra-prediction mode of the sub-block at position (x,y) in the CU, and wherein a, b, and c represent intra-prediction modes of the control point blocks;
determine a second intra-prediction mode based on the intra-prediction modes of the one or more control point blocks and a second position of a second one of the sub-blocks, the second intra-prediction mode being different than the first intra-prediction mode, wherein determining the second intra-prediction mode comprises determining the second intra-prediction mode according to the formula $IPM_{(x,y)} = ax+by+c$;
form intra-prediction blocks for each of the sub-blocks, including forming a first intra-prediction block for the first one of the sub-blocks using the first intra-prediction mode and forming a second intra-prediction block for the second one of the sub-blocks using the second intra-prediction mode; and
code the CU using the intra-prediction blocks.

29. A device for coding video data, the device comprising:
a memory configured to store video data; and
one or more processors implemented in circuitry and configured to:
partition a coding unit (CU) of video data into sub-blocks, the sub-blocks being arranged into a number of rows and a number of columns, the number of rows being greater than 1 and the number of columns being greater than 1;
determine a first intra-prediction mode based on intra-prediction modes of one or more control point blocks comprising neighboring blocks to the CU and a first position of a first one of the sub-blocks, wherein determining the first intra-prediction mode comprises determining the first intra-prediction mode according to the formula $$IPM_{(x,y)} = \frac{(IPM_{ctrp1} - IP_{ctrp0})}{width}x + \frac{(IPM_{ctrp2} - IPM_{ctrp})}{height}y + IPM_{ctrp},$$

wherein $IPM(x,y)$ represents the intra-prediction mode of the sub-block at position (x,y) in the CU, wherein $IPM_{ctrpN}$ represents the intra-prediction mode of the Nth control point, wherein width represents a width of the CU, and wherein height represents a height of the CU;
determine a second intra-prediction mode based on the intra-prediction modes of the one or more control point blocks and a second position of a second one of the sub-blocks, the second intra-prediction mode being different than the first intra-prediction mode, wherein determining the second intra-prediction mode comprises determining the second intra-prediction mode according to the formula $$IPM_{(x,y)} = \frac{(IPM_{ctrp1} - IPM_{ctrp0})}{width}x + \frac{(IPM_{ctrp2} - IPM_{ctr})}{height}y + IPM_{ctrp0};$$

form intra-prediction blocks for each of the sub-blocks, including forming a first intra-prediction block for the first one of the sub-blocks using the first intra-prediction mode and forming a second intra-prediction block for the second one of the sub-blocks using the second intra-prediction mode; and
code the CU using the intra-prediction blocks.

30. A device for coding video data, the device comprising:
a memory configured to store video data; and
one or more processors implemented in circuitry and configured to:
partition a coding unit (CU) of video data into sub-blocks, the sub-blocks being arranged into a number of rows and a number of columns, the number of rows being greater than 1 and the number of columns being greater than 1;
determine a first intra-prediction mode for a first one of the sub-blocks and determining a second intra-prediction mode for a second one of the sub-blocks according to the formula $$Ang(IPM_{(x,y)}) = \frac{(Ang(IPM_{ctr}) - Ang(IPM_{ctr}))}{width}x +$$

-continued $$\frac{(Ang(IPM_{ctrp2}) - Ang(IPM_{ctrp0}))}{height} y + Ang(IPM_{ctrp0}),$$

wherein $Ang(IPM(x,y))$ represents an angle of an intra-prediction mode of a sub-block at position $(x,y)$ in the CU, $Ang(IPMctrpN)$ represents an angle of an intra-prediction mode of an Nth control point block for the CU, width represents a width of the CU, and height represents a height of the CU;

form intra-prediction blocks for each of the sub-blocks, including forming a first intra-prediction block for the first one of the sub-blocks using the first intra-prediction mode and forming a second intra-prediction block for the second one of the sub-blocks using the second intra-prediction mode; and code the CU using the intra-prediction blocks.

\* \* \* \* \*